United States Patent
Carlson et al.

(10) Patent No.: US 7,792,148 B2
(45) Date of Patent: Sep. 7, 2010

(54) VIRTUAL FIBRE CHANNEL OVER ETHERNET SWITCH

(75) Inventors: Scott M Carlson, Tucson, AZ (US); Daniel G Eisenhauer, Austin, TX (US); Roger G Hathorn, Tucson, AZ (US); Sandy K Kao, Austin, TX (US); Jeffrey W Palm, Rochester, MN (US); Renato J Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 12/058,871

(22) Filed: Mar. 31, 2008

(65) Prior Publication Data

US 2009/0245242 A1    Oct. 1, 2009

(51) Int. Cl.
H04J 3/24 (2006.01)
(52) U.S. Cl. ..................................... 370/474
(58) Field of Classification Search .................. 370/386, 370/445, 474, 389, 466, 229, 235, 392, 428
See application file for complete search history.

(56) References Cited

U.S. PATENT DOCUMENTS

| | | | |
|---|---|---|---|
| 6,704,812 B2 | 3/2004 | Bakke et al. | |
| 6,819,654 B2 | 11/2004 | Soloway et al. | |
| 6,895,528 B2 | 5/2005 | Cantwell et al. | |
| 7,281,169 B2 | 10/2007 | Golasky et al. | |
| 7,558,195 B1 * | 7/2009 | Kuo et al. | 370/219 |
| 2003/0026267 A1 | 2/2003 | Oberman et al. | |
| 2004/0003140 A1 | 1/2004 | Rimmer et al. | |
| 2004/0081087 A1 | 4/2004 | Shea | |
| 2005/0050243 A1 | 3/2005 | Clark | |
| 2006/0251067 A1 * | 11/2006 | DeSanti et al. | 370/389 |
| 2007/0058620 A1 * | 3/2007 | Willeke et al. | 370/386 |
| 2007/0098012 A1 | 5/2007 | Pettey et al. | |

OTHER PUBLICATIONS

Baldwin et al., "Innovation for Making Virtual Storage Area Networks", IBM, pp. 1-2.
"Fibre Channel Standard Hub-Loop Redundancy for Higher RAS", IBM Corp. vol. 37, No. 04A, Apr. 1994, pp. 383-385.
Kubo et al., "In-Band Control of Indicators to Identify Devices Distributed on the Same Domain", IBM, pp. 1-3.

* cited by examiner

*Primary Examiner*—Dang T Ton
*Assistant Examiner*—Nourali Mansoury
(74) *Attorney, Agent, or Firm*—Yee & Associates, P.C.; Matthew W. Baca

(57) ABSTRACT

A system for using a virtual switch in a network. In response to a switch connecting to a network, network configuration data is read to determine whether the switch is part of a virtual switch. In response to determining that the switch is part of the virtual switch, a priority number for the switch is sent to other switches connected to the network. Priority numbers are received from the other switches. It is determined whether the switch has a highest priority number. In response to determining that the switch does have the highest priority number, the switch is selected to be a master switch for the virtual switch. Then, domain identification data for the virtual switch is sent to the other switches. Afterward, the switch and the other switches respond to requests over the network as one domain identified by the domain identification data.

20 Claims, 6 Drawing Sheets

VIRTUAL FIBRE CHANNEL OVER ETHERNET SWITCH

BACKGROUND OF THE INVENTION

1. Field of the Invention

The present invention relates generally to an improved data processing system and more specifically to a computer implemented method, system, and computer usable program code for creating and utilizing a virtual switch in a Fibre Channel over Ethernet (FCoE) network.

2. Description of the Related Art

Today, in Fibre Channel (FC) networks, end ports are connected to one and only one switch. If the switch that an end port is connected to fails, the port becomes inaccessible. If a customer wants an end point to remain operational in the face of a switch failure, the customer may use multiple end ports per end point and redundant switch topologies to enable multiple paths between end points. This type of solution is fully redundant.

However, if a customer does not want to invest in a fully redundant fabric, the customer may use redundancy in intermediary switches and a fully interconnected topology. In this type of solution a failure to an intermediary switch may be tolerated, though it may take a long time for the switch failure to be detected and the routing paths on the FC fabric to be modified. This type of solution is a redundant intermediary switch solution.

BRIEF SUMMARY OF THE INVENTION

According to one embodiment of the present invention, a virtual switch is created and used in a network. In response to a switch connecting to a network, network configuration data is read to determine whether the switch is part of a virtual switch. In response to determining that the switch is part of the virtual switch, a priority number for the switch is sent to other switches connected to the network. Priority numbers are received from the other switches. It is determined whether the switch has a highest priority number. In response to determining that the switch does have the highest priority number, the switch is selected to be a master switch for the virtual switch. Then, domain identification data for the virtual switch is sent to the other switches. Afterward, the switch and the other switches respond to requests over the network as one domain identified by the domain identification data.

DETAILED DESCRIPTION OF THE INVENTION

Figure 1:
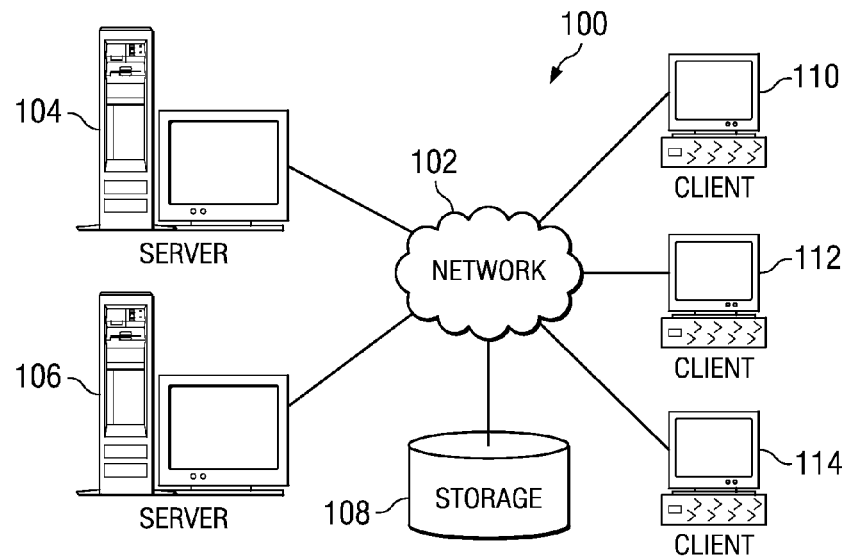
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
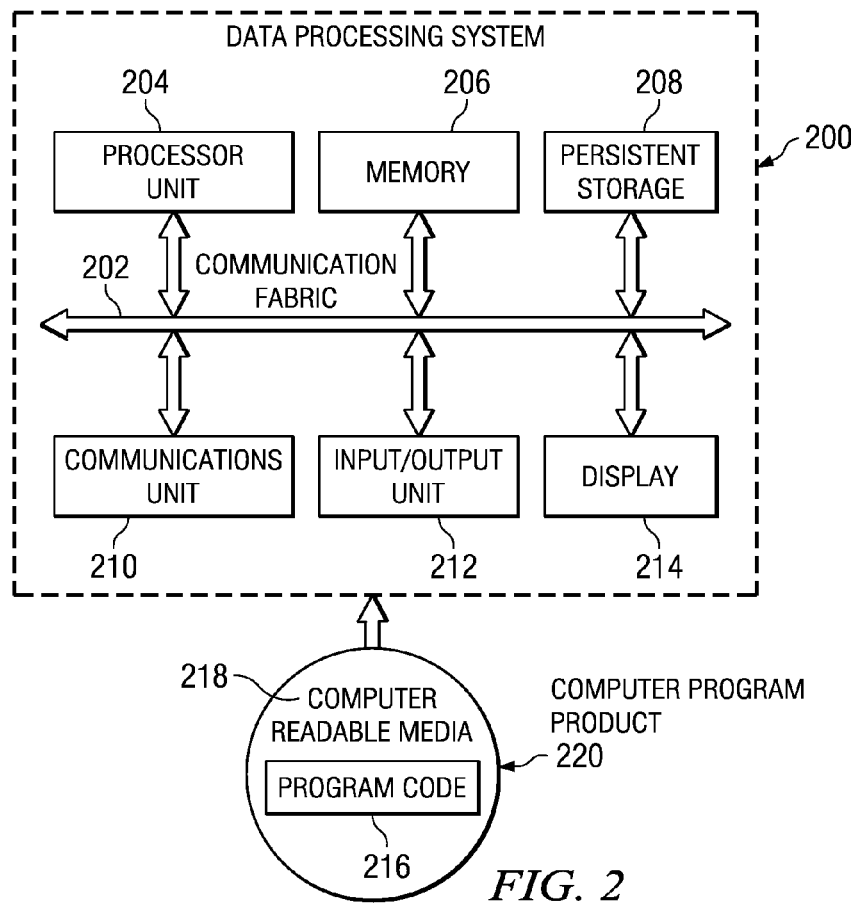
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. For example, network data processing system 100 may represent a FC switched fabric topology in a storage area network (SAN). FC is a gigabit-speed network technology primarily used to connect storage devices. A switched fabric is a network topology where devices may connect with each other via switches. This switched fabric, which supports redundant paths between multiple devices, forms a mesh-like network. A SAN is a high-speed special-purpose network or sub-network that interconnects different kinds of data storage devices, such as, for example, disk arrays and tape libraries, with associated data servers on behalf of a larger network of users. Typically, a SAN is part of the overall network of computing resources for an enterprise.

Network data processing system 100 contains network 102. Network 102 is the medium used to provide communications links between the various computers and devices connected together within network data processing system 100. Network 102 may include connections, such as wire, wireless communication links, or fiber optic cables.

In the depicted example, server 104 and server 106 connect to network 102, along with storage unit 108. In addition, clients 110, 112, and 114 connect to network 102. Clients 110, 112, and 114 may, for example, be storage devices, network computers, or personal computers. In the depicted example, server 104 and/or server 106 may provide data, such as boot files, operating system images, and applications to clients 110, 112, and 114. Clients 110, 112, and 114 are clients to server 104 and server 106 in this example. Network data processing system 100 may include additional servers, clients, and other devices, such as, for example, switches and routers, not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments provide a computer implemented method, system, and computer usable program code for creating and using an FCoE virtual switch in an FCoE network. FCoE maps FC over Ethernet. FCoE may, for example, utilize Ethernet with Pause or Convergence Enhanced Ethernet, which adds enhancements that enable FC and other traffic types to flow over the same wire.

In response to an FCoE switch connecting to the FCoE network, the FCoE switch reads network configuration data to determine whether the FCoE switch is part of a virtual FCoE switch. The network configuration data may, for example, be locally stored in the FCoE switch, itself. Alternatively, the network configuration data may be received from another FCoE switch, from a central server, or from some other remote device. In response to determining that the FCoE switch is part of the virtual FCoE switch, the FCoE switch sends its priority number to other FCoE switches connected to the FCoE network. Then, the FCoE switch receives the priority numbers from the other switches. Subsequently, the FCoE switch determines whether the FCoE switch has a highest priority number. In response to determining that the FCoE switch does have the highest priority number, the FCoE switch becomes a master switch for the virtual FCoE switch. Then, the FCoE switch sends domain identification data for the virtual FCoE switch to the other FCoE switches. However, it should be noted that illustrative embodiments are not restricted to the above-described master switch election process. Illustrative embodiments may utilize any type of master switch election in accordance with processes of illustrative embodiments. In other words, it does not matter how a master switch is elected or chosen, only that a master is selected. Afterward, the FCoE switch and the other FCoE switches now respond to network discovery/configuration requests as one domain, which is identified by the domain identification data.

Thus, illustrative embodiments provide the configuration of a redundant intermediary switch solution, which tolerates the failure of an FCoE switch, without impacting the N_Port Identifier (ID) of FCoE end ports. An N_Port is a network port that is used to connect a node or device, such as a storage device, to a FC. The N_Port handles creation, detection, and flow of message units to and from the connected device.

In addition, illustrative embodiments are able to effectively manage the situation when the FCoE switch, which interconnects the FC and Ethernet fabrics, fails. Illustrative embodiments comprehend that N_Port IDs for the FCoE end ports on the Ethernet side of the fabric are assigned to FCoE switches. Upon failure of an FCoE switch, illustrative embodiments reassign the N_Port IDs for the FCoE end ports from the failed FCoE switch to an operational FCoE switch, without impacting the end ports on either side of the FC or Ethernet fabrics (i.e. FCoE N_Ports or FC N_Ports).

FCoE switches, which share a common domain ID, are configured to appear to the FCoE SAN as a single logical or virtual switch. A domain ID is a unique number that identifies a switch to the network fabric. Domain IDs are used by FC to route packets.

A protocol between the FCoE switches, which comprise the virtual switch, selects a master switch and backup switches. In addition, a "keep alive" protocol between these FCoE switches that comprise the virtual switch, detects failure of the master switch. The highest priority backup switch now becomes the new master switch. It should be noted that all switches in the network know what domain ID is being used because the domain ID was communicated to each of the switches during switch initialization.

All switches participate in the routing and delivering of data frames in the network. The master switch is the only switch that determines what switch should respond and how that switch is to respond to discovery and fabric login requests. A "multicast" protocol between the switches that make up the virtual switch, keeps port ID assignment information synchronized. As a result, no change is needed to assigned end port IDs.

Figure 3:
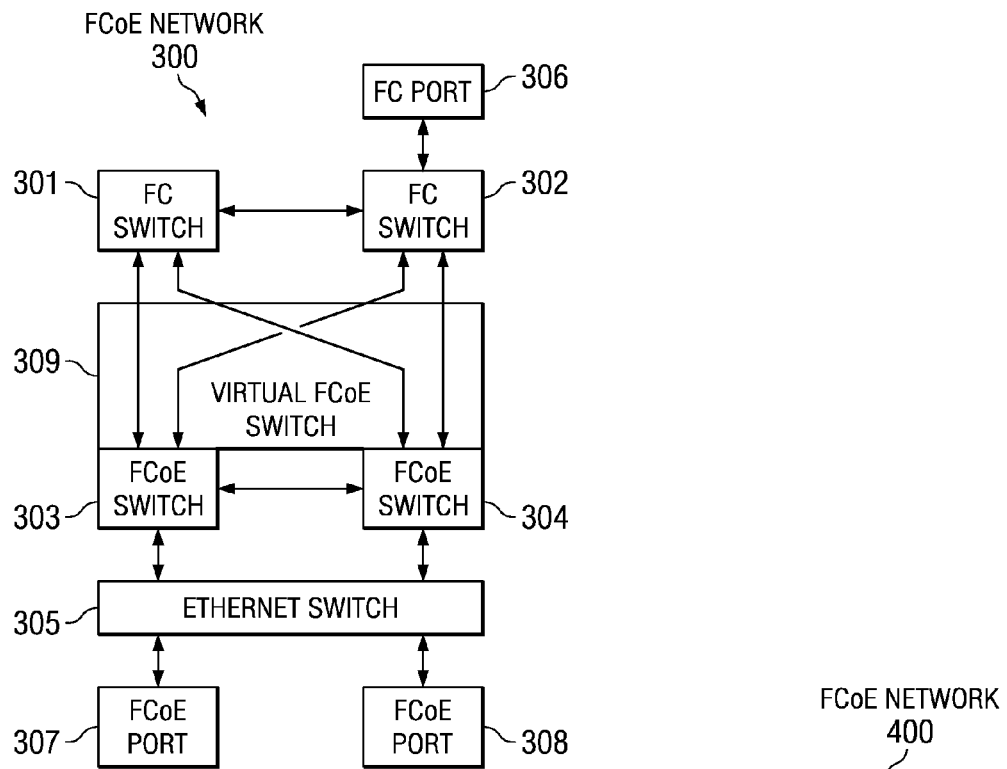
FIG. 3 is an exemplary illustration of an FCoE network with a virtual FCoE switch in accordance with an illustrative embodiment.

With reference now to FIG. 3, an exemplary illustration of an FCoE network with a virtual FCoE switch is depicted in accordance with an illustrative embodiment. FCoE network 300 may, for example, be implemented in network data processing system 100 in FIG. 1. In addition, FCoE network 300 may, for example, be a SAN.

FCoE network 300 includes FC switch 301, FC switch 302, FCoE switch 303, FCoE switch 304, and Ethernet switch 305. In addition, FCoE network 300 also includes FC port 306, which connects to FC switch 302, and FCoE ports 307 and 308, which connect to Ethernet switch 305. However, it should be noted that illustrative embodiments are not restricted to such. FIG. 3 is only meant as an illustrative example and not as a limitation to illustrative embodiments. Consequently, illustrative embodiments may include more or fewer switches, ports, and other various devices as needed by processes of illustrative embodiments.

In this illustrative example, FCoE switches 303 and 304 are configured to appear to FCoE network 300 as a single virtual or logical switch, such as virtual FCoE switch 309. Virtual FCoE switch 309 is a logical representation of a master and backup switches acting as one group. Thus, two or more physical switches, such as FCoE switches 301 and 302, are configured to stand for virtual FCoE switch 309.

FCoE switches 303 and 304 appear to FCoE network 300 as virtual FCoE switch 309 with two redundant connections, each to FC switches 301 and 302. Virtual FCoE switch 309 uses one domain ID, which in this example is domain ID 9. As a result, FCoE ports 307 and 308 are assigned N_Port IDs of 0x09xxxx.

Illustrative embodiments utilize a protocol between FCoE switches 303 and 304, which comprise virtual FCoE switch 309, to select a master switch and a backup switch. In this example, FCoE switch 304 is the master switch and FCoE switch 303 is the backup switch. Also, it should be noted that illustrative embodiments may include more than one backup switch.

In addition, illustrative embodiments utilize a "keep alive" protocol between FCoE switches 303 and 304 to detect switch failure on the Ethernet side of the fabric. FCoE switches 303 and 304 both realize that they are on the same Ethernet switch 305. Moreover, illustrative embodiments utilize a "multicast" protocol between FCoE switches 303 and 304 to keep FCoE port ID assignment information synchronized. The "multicast" protocol broadcasts this port ID assignment data for FCoE ports 307 and 308 to all backup FCoE switches.

If physical FCoE switch 304, which is the master switch in this example, fails, then FC switches 301 and 302 each see one of their connections to virtual FCoE switch 309 fail through domain ID 9. However, FC switches 301 and 302 each still have a remaining connection through physical FCoE switch 303. As a result, data routing for FC switches 301 and 302 changes to drop the failed redundant connection to FCoE switch 304. FCoE switch 303 now takes over as the master switch from FCoE switch 304 for virtual FCoE switch 309 (i.e., domain ID 9). Further, Ethernet data traffic is rerouted via a protocol, which is similar to a virtual router redundancy protocol (VRRP), through FCoE switch 303. Consequently, the port IDs, which are assigned to FCoE ports 307 and 308, do not need to change.

Figure 4:
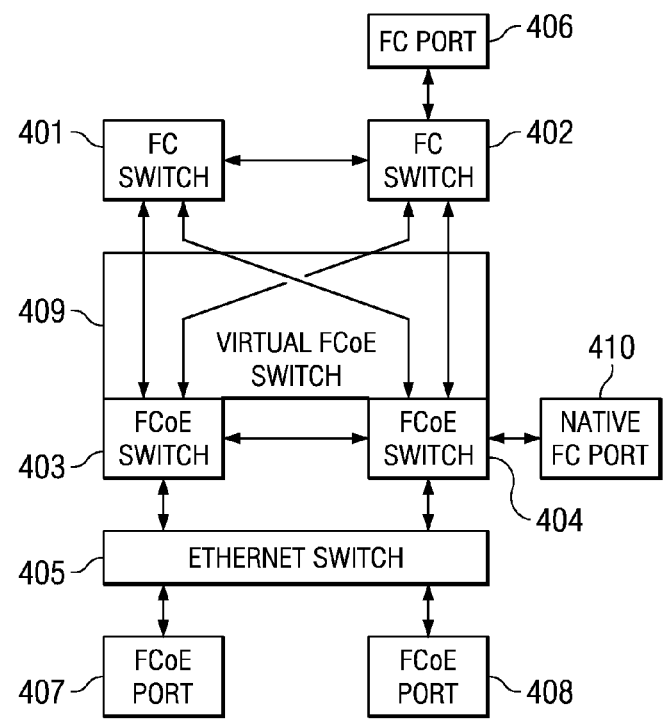
FIG. 4 is an exemplary illustration of an FCoE network with FCoE switches that have directly attached native FC end ports in accordance with an illustrative embodiment.

With reference now to FIG. 4, an exemplary illustration of an FCoE network with FCoE switches that have directly attached native FC end ports is depicted in accordance with an illustrative embodiment. FCoE network 400 may, for example, be implemented in FCoE network 300 in FIG. 3. FCoE network 400 includes FC switches 401 and 402, FCoE switches 403 and 404, and Ethernet switch 405. In addition, FCoE network 400 also includes FC port 406, which connects to FC switch 402, and FCoE ports 407 and 408, which connect to Ethernet switch 405. Further, FCoE switches 403 and 404 comprise virtual FCoE switch 409. Furthermore, FCoE network 400 further includes native FC port 410, which directly connects to FCoE switch 404.

In the event FCoE switch 404 fails, FCoE switch 403 is not able to access native FC port 410. FCoE switches 403 and 404 act as virtual FCoE switch 409 (i.e., domain ID 9) for attached FCoE ports 407 and 408. Moreover, FCoE switch 404 also responds to discovery/routing procedures as a separate unique domain ID (i.e., domain ID 4) for native FC port 410.

Native FC port 410 and other native FC ports are assigned port IDs based on the physical FCoE switch's domain ID that they are attached to. Consequently, in this example native FC port 410 is assigned a port ID of 0x04xxxx. In contrast, FCoE ports 407 and 408 are assigned a port ID of 0x09xxxx based on virtual FCoE switch 409's domain ID. Protocols utilized by illustrative embodiments do not communicate port ID assignment information for native FC port 410 between FCoE switches 403 and 404.

If physical FCoE switch 404, which is the master switch in this example, fails, FC switches 401 and 402 each see one of their connections to virtual FCoE switch 409 through domain ID 9 fail. However, FC switches 401 and 402 each still have a remaining connection through physical FCoE switch 403. As a result, data routing for FC switches 401 and 402 changes to drop the failed redundant connection to FCoE switch 404. In addition, switches 401 and 402 also each see their direct connection to domain ID 4 fail.

FCoE switch 403 now takes over as the master switch from FCoE switch 404 for virtual FCoE switch 409 (i.e., domain ID 9). Further, Ethernet data traffic is rerouted via a protocol, which is similar VRRP, through FCoE switch 403. Consequently, the port IDs, which are assigned to FCoE ports 407 and 408, do not need to change. No route is discovered to domain ID 4. Therefore, communication to native FC port 410 is lost.

Figure 5:
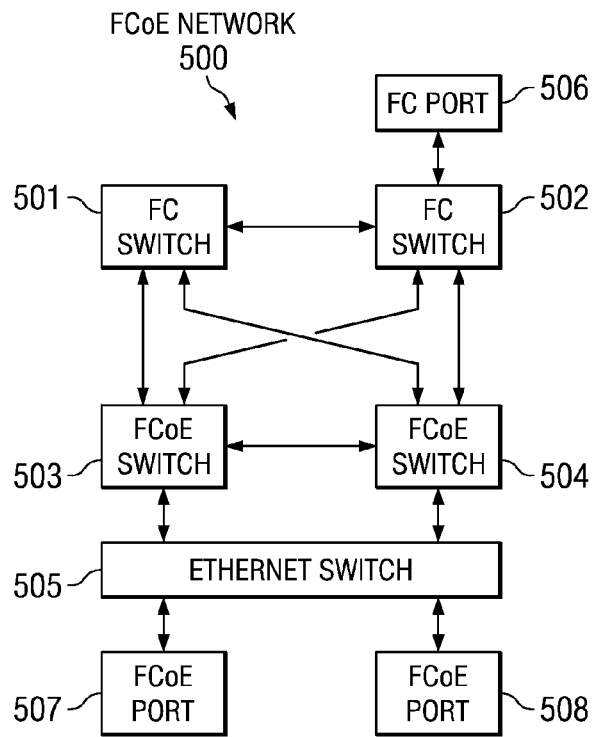
FIG. 5 is an exemplary illustration of an FCoE network without a virtual FCoE switch in accordance with an illustrative embodiment.

With reference now to FIG. 5, an exemplary illustration of an FCoE network without a virtual switch is depicted in accordance with an illustrative embodiment. FCoE network 500 includes FC switches 501 and 502, FCoE switches 503 and 504, and Ethernet switch 505. In addition, FCoE network 500 also includes FC port 506, which connects to FC switch 502, and FCoE ports 507 and 508, which connect to Ethernet switch 505.

FCoE switches 503 and 504 are configured to know that they may each access a different set of FCoE ports. For example, some FCoE ports are associated with FCoE switch 503 and some FCoE ports are associated with FCoE switch 504. In this example, FCoE port 507 is associated with FCoE switch 503 and FCoE port 508 is associated with FCoE switch 504.

Also in this example, FCoE switches 503 and 504 appear to FC switches 501 and 502 as legacy FC switches each with their own unique domain ID, such as domain ID 3 for FCoE switch 503 and domain ID 4 for FCoE switch 504. This is in contrast to the examples shown in FIGS. 3 and 4 where the FCoE switches shared a common domain ID, such as domain ID 9, for the virtual FCoE switch. In other words, the illustrative embodiment depicted in FIG. 5 does not utilize a virtual FCoE switch. As a result of FCoE switches 503 and 504 having their own respective domain ID, no change to existing FC protocols is required. A "keep alive" protocol between FCoE switches 503 and 504 is used to detect switch failures. In addition, a "multicast" protocol between FCoE switches 503 and 504 is used to keep port ID assignment information synchronized.

If FCoE switch 504 fails, then FC switches 501 and 502 each see their direct connection to FCoE switch 504 (i.e., domain ID 4) fail. FC switches 501 and 502 do not know if FCoE switch 504 failed or just their connection to FCoE switch 504 failed. As a result, FC switches 501 and 502 go through a new discovery phase. FCoE switch 503 detects FCoE switch 504 failure on the Ethernet side of the fabric and reroutes Ethernet traffic via a VRRP-like protocol by taking over the MAC addresses for FCoE switch 504.

FCoE network 500 reroutes data by FCoE switch 503 responding to discovery/routing procedures as if FCoE switch 504 is still alive. FCoE switch 503 pretends to be the only switch with an alive connection to FCoE switch 504. Also, FC switches 501 and 502 reroute all traffic for FCoE switch 504 (i.e., domain ID 4) to FCoE switch 503 (i.e., domain ID 3). Consequently, the end port IDs, which are assigned to FCoE ports 507 and 508, do not need to change.

Figure 6:
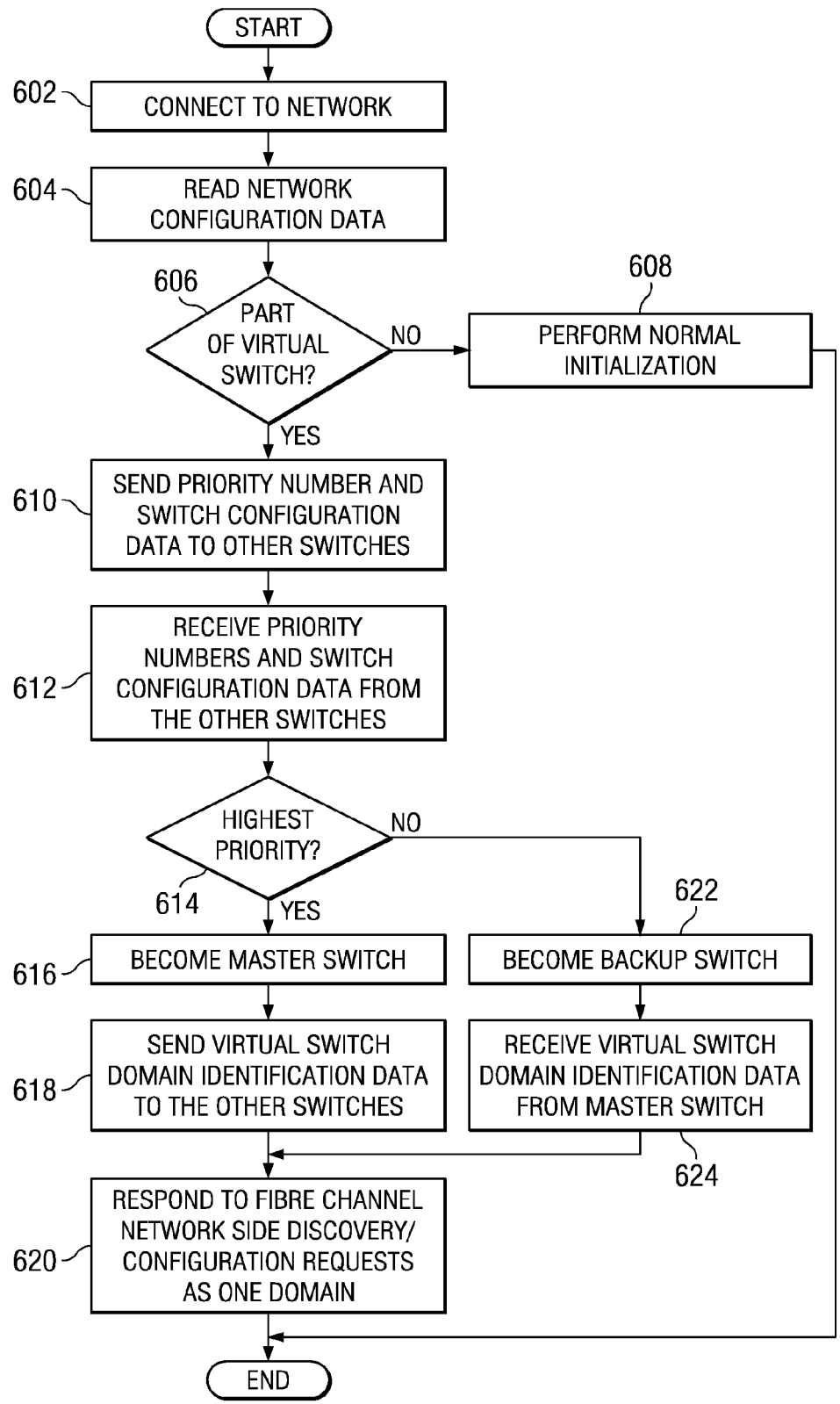
FIG. 6 is a flowchart illustrating an exemplary process for creating a virtual FCoE switch in accordance with an illustrative embodiment.

With reference now to FIG. 6, a flowchart illustrating an exemplary process for creating a virtual FCoE switch is shown in accordance with an illustrative embodiment. The process shown in FIG. 6 may be implemented in an FCoE network, such as FCoE network 300 in FIG. 3. The FCoE network, may for example, be a SAN.

The process begins when an FCoE switch, such as FCoE switch 303 in FIG. 3, connects to the FCoE network (step 602). After connecting to the FCoE network in step 602, the FCoE switch reads the network configuration data for the FCoE network (step 604). The network configuration data is stored in the FCoE switch. Also, the network configuration data may, for example, include a list of other FCoE switches connected to the FCoE network, along with their respective priority numbers or values. In addition, the network configuration data may also include information as to whether the FCoE switch is part of a virtual FCoE switch.

Subsequent to the FCoE switch reading the network configuration data in step 604, the FCoE switch makes a determination as to whether the FCoE switch is part of a virtual FCoE switch, such as virtual FCoE switch 309 in FIG. 3 (step 606). If the FCoE switch is not part of a virtual FCoE switch, no output of step 606, then the FCoE switch performs a normal initialization (step 608) and the process terminates thereafter. If the FCoE switch is part of a virtual FCoE switch, yes output of step 606, then the FCoE switch sends its priority number and its switch configuration data to the other FCoE switches connected to the network (step 610). The switch configuration data includes all information about the switch.

Subsequent to sending its priority number to the other FCoE switches in step 610, the FCoE switch receives the priority numbers and switch configuration data from the other FCoE switches (step 612). Then, the FCoE switch makes a determination as to whether the FCoE switch has the highest priority (step 614). If the FCoE switch has the highest priority, yes output of step 614, then the FCoE switch becomes the master switch (step 616).

After becoming the master switch in step 616, the FCoE switch sends virtual switch domain ID data to the other FCoE switches (step 618). Subsequently, the FCoE switches respond to FC network side discovery or configuration requests as one domain (step 620). The process terminates thereafter.

Returning again to step 614, if the FCoE switch does not have the highest priority, no output of step 614, then the FCoE switch becomes a backup switch (step 622). Subsequent to becoming a backup switch in step 622, the FCoE switch receives the virtual domain ID data from the master switch (step 626). Thereafter, the process returns to step 620 where the FCoE switches respond to FCoE network side discovery or configuration requests as one domain.

Figure 7:
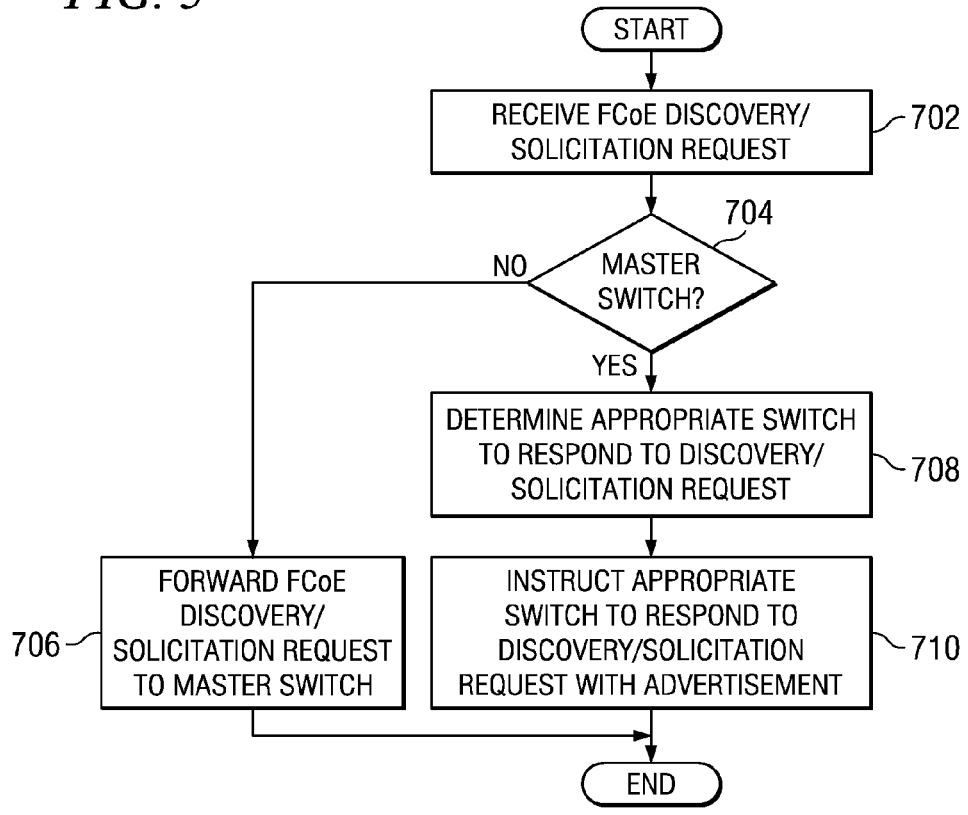
FIG. 7 is a flowchart illustrating an exemplary process for discovering FCoE switches in accordance with an illustrative embodiment.

With reference now to FIG. 7, a flowchart illustrating an exemplary process for discovering FCoE switches is shown in accordance with an illustrative embodiment. The process shown in FIG. 7 may be implemented in an FCoE network, such as FCoE network 300 in FIG. 3.

The process begins when an FCoE switch, such as FCoE switch 304 in FIG. 3, receives an FCoE discovery or solicitation request from a device connected to the FCoE network (step 702). After receiving the FCoE discovery/solicitation request in step 702, the FCoE switch makes a determination as to whether the FCoE switch is the master switch (step 704). If the FCoE switch is not the master switch, no output of step 704, then the FCoE switch forwards the FCoE discovery/solicitation request to the master switch (step 706). Thereafter, the process terminates. If the FCoE switch is the master switch, yes output of step 704, then the master switch determines the appropriate FCoE switch to respond to the discovery/solicitation request (step 708). The appropriate FCoE switch may be the master switch or one of the backup switches. Subsequently, the master switch instructs the appropriate switch to respond to the FCoE discovery/solicitation request with an advertisement (step 710). The advertisement may, for example, tell the requesting device that the responding device is present, that the responding device is a switch, and provide the MAC address for the switch. The process terminates thereafter.

Figure 8:
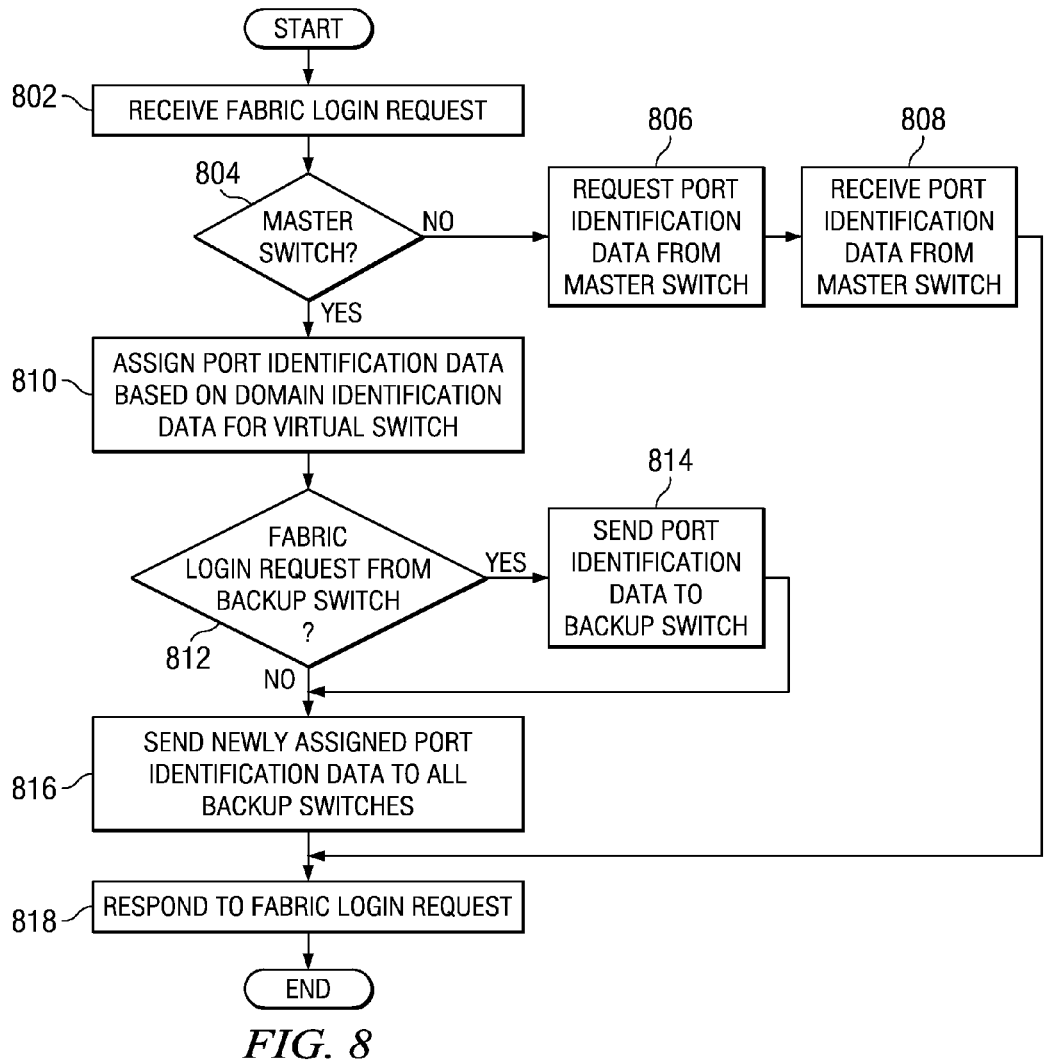
FIG. 8 is a flowchart illustrating an exemplary process for assigning end port ID data in accordance with an illustrative embodiment.

With reference now to FIG. 8, a flowchart illustrating an exemplary process for assigning end port ID data is shown in accordance with an illustrative embodiment. The process shown in FIG. 8 may be implemented in an FCoE network, such as FCoE network 300 in FIG. 3.

The process begins when an FCoE switch, such as FCoE switch 303 in FIG. 3, receives a fabric login (FLOGI) request from a device connected to the FCoE network (step 802). The FLOGI request is received in response to an advertisement, such as, for example, the advertisement sent to a device in step 708 of FIG. 7. FLOGI is the process by which an FC enabled device establishes a logical connection to an FCoE switch.

After receiving the FLOGI request in step 802, the FCoE switch makes a determination as to whether the FCoE switch is the master switch (step 804). If the FCoE switch is not the master switch, no output of step 804, then the FCoE switch requests port ID data from the master switch (step 806). Subsequent to requesting port ID data from the master switch in step 806, the FCoE switch receives the port ID data from the master switch (step 808). Thereafter, the process proceeds to step 818.

Returning again to step 804, if the FCoE switch is the master switch, yes output of step 804, then the FCoE switch assigns port ID data to FCoE end ports, such as FCoE ports 307 and 308 in FIG. 3, based on domain ID data for the virtual switch (step 810). Then, the FCoE switch makes a determination as to whether the FLOGI request was received from a backup switch (step 812). If the FLOGI request was received from a backup switch, yes output of step 812, then the FCoE switch sends the port ID data for the FCoE end ports to the backup switch (step 814). Thereafter, the process proceeds to step 816.

If the FLOGI request was not received from a backup switch, no output of step 812, then the FCoE switch sends the newly assigned port ID data for the FCoE end ports to all backup switches connected to the network via a "multicast" protocol (step 816). Afterward, the FCoE switch responds to the FLOGI request (step 818). The process terminates thereafter.

Figure 9:
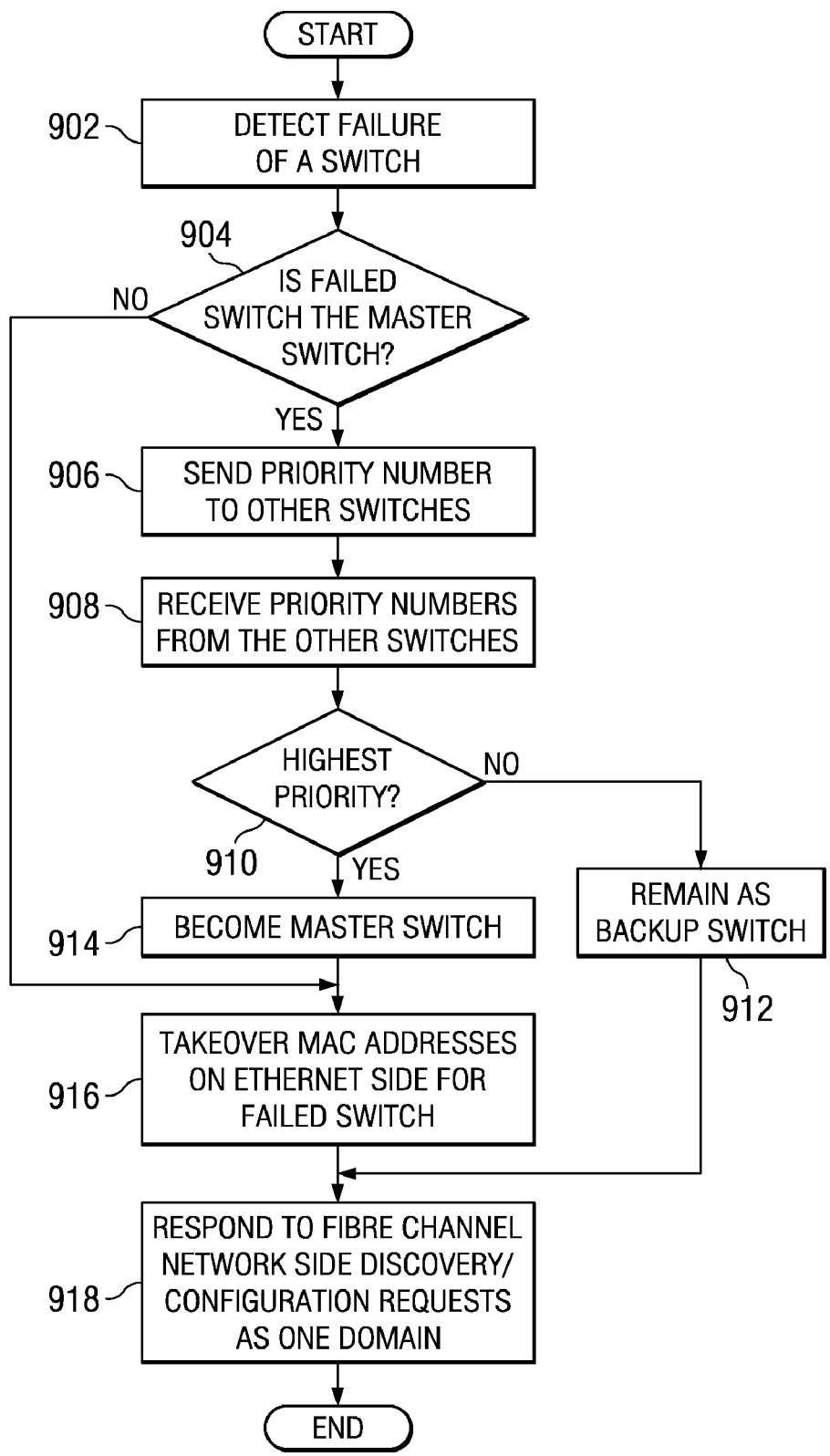
FIG. 9 is a flowchart illustrating an exemplary process for detecting failure of an FCoE switch in accordance with an illustrative embodiment.

With reference now to FIG. 9, a flowchart illustrating an exemplary process for detecting failure of an FCoE switch is shown in accordance with an illustrative embodiment. The process shown in FIG. 9 may be implemented in an FCoE network, such as FCoE network 300 in FIG. 3.

The process begins when an FCoE switch, such as FCoE switch 303 in FIG. 3, detects failure of another FCoE switch (step 902). After detecting the failure of the other switch in step 902, the FCoE switch makes a determination as to whether the failed switch is the master switch (step 904). If the failed switch is not the mater switch, no output of step 904, then the process proceeds to step 916. If the failed switch is the mater switch, yes output of step 904, then the FCoE switch sends its priority number to the other FCoE switches connected to the network (step 906). Subsequent to the FCoE switch sending its priority number to the other FCoE switches in step 906, the FCoE switch receives the priority numbers from the other FCoE switches (step 908).

Then, the FCoE switch makes a determination as to whether the FCoE switch has the highest priority number (step 910). If the FCoE switch does not have the highest priority number, no output of step 910, then the FCoE switch remains as a backup switch (step 912). Thereafter, the process proceeds to step 916. If the FCoE switch does have the highest priority number, yes output of step 910, then the FCoE switch becomes the master switch (step 914).

After becoming the master switch in step 914, the FCoE switch takes over the MAC addresses on the Ethernet side of the fabric for the failed switch (step 916). In an alternative illustrative embodiment, instead of taking over all the MAC addresses from the failed switch, the master FCoE switch selects one or more backup FCoE switches to take over certain MAC addresses from the failed switch and instructs the selected backup switches to perform the MAC address take over accordingly. Subsequently, the FCoE switches respond to FC network side discovery or configuration requests as one domain (step 918). The process terminates thereafter.

Thus, illustrative embodiments provide a computer implemented method, system, and computer program product for creating and utilizing a virtual switch in an FCoE storage area network. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for using a virtual switch in a network, the computer implemented method comprising:
responsive to a switch connecting to the network, reading network configuration data to determine whether the switch is part of the virtual switch;
responsive to determining that the switch is part of the virtual switch, sending a priority number for the switch to other switches in the virtual switch connected to the network;
receiving priority numbers from the other switches in the virtual switch;
determining whether the switch has a highest priority number;
responsive to determining that the switch does have the highest priority number, selecting the switch to become a master switch for the virtual switch;
sending domain identification data for the virtual switch to the other switches in the virtual switch, wherein the master switch and the other switches in the virtual switch respond to a plurality of requests over the network as one domain identified by the domain identification data for the virtual switch;
responsive to receiving a request within the plurality of requests over the network, determining by the master switch an appropriate switch within the virtual switch to respond to the request so that all switches in the virtual switch participate in routing data in the network; and
instructing by the master switch the appropriate switch within the virtual switch to respond to the request.

2. The computer implemented method of claim 1, further comprising:
responsive to determining that the switch does not have the highest priority number, the switch becoming a backup switch for the virtual switch; and
receiving the domain identification data for the virtual switch from the master switch.

3. The computer implemented method of claim 1, further comprising:
responsive to determining that the switch is not part of the virtual switch, performing normal initialization.

4. The computer implemented method of claim 1, further comprising:
responsive to receiving the request within the plurality of requests over the network, determining whether the switch receiving the request is the master switch.

5. The computer implemented method of claim 4, further comprising:
responsive to determining that the switch receiving the request is not the master switch, forwarding the request to the master switch.

6. The computer implemented method of claim 1, further comprising:
responsive to selecting the switch to become the master switch, assigning by the master switch, port identification data, to end port in the network based on the domain identification data for the virtual switch; and
sending the port identification data assigned to the end ports in the network by the master switch to the other switches in the virtual switch.

7. The computer implemented method of claim 1, further comprising:
responsive to detecting a failed master switch and to determining that the switch does have the highest priority number, taking over, by the master switch, media access control from the failed master switch.

8. The computer implemented method of claim 7, wherein the switch taking over the media access control addresses from the failed master switch selects one or more of the other switches in the virtual switch to take over certain media access control addresses within the media access control addresses taken over from the failed master switch and instructs the one or more of the other switches in the virtual switch selected to perform take over of the certain media access control addresses accordingly.

9. The computer implemented method of claim 1, wherein the master switch and the other switches in the virtual switch interconnect a fibre channel fabric and an Ethernet fabric.

10. The computer implemented method of claim 1, wherein the master switch and the other switches in the virtual switch make up the virtual switch, and wherein the master switch and the other switches in the virtual switch share a common domain identification number.

11. The computer implemented method of claim 6, wherein a switch failure does not require the port identification data for the end ports to change.

12. The computer implemented method of claim 1, wherein the network is a fiber channel over an Ethernet network, and wherein the fiber channel over the Ethernet network maps a fibre channel fabric over an Ethernet fabric.

13. The computer implemented method of claim 12, wherein the fibre channel over the Ethernet network is a fibre channel over Ethernet storage area network.

14. The computer implemented method of claim 1, wherein the network configuration data is stored in the switch, and wherein the network configuration data includes a list of the other switches in the virtual switch, the priority numbers for the other switches in the virtual switch, and whether the switch is part of the virtual switch.

15. The computer implemented method of claim 1, wherein the master switch and the other switches in the virtual switch are fibre channel over Ethernet switches.

16. A data processing system for using a virtual switch in a network, comprising:
a bus system;
a storage device connected to the bus system, wherein the storage device includes a set of instructions; and
a processing unit connected to the bus system, wherein the processing unit executes the set of instructions to read network configuration data to determine whether a switch is part of the virtual switch in response to the switch connecting to the network; send a priority number for the switch to other switches in the virtual switch connected to the network in response to determining that the switch is part of the virtual switch; receive priority numbers from the other switches in the virtual switch; determine whether the switch has a highest priority number; select the switch to be a master switch for the virtual switch in response to determining that the switch does have the highest priority number; send domain identification data for the virtual switch to the other switches in the virtual switch, wherein the master switch and the other switches in the virtual switch respond to a plurality of requests over the network as one domain identified by the domain identification data for the virtual switch; determine by the master switch an appropriate switch within the virtual switch to respond to a request within the plurality of requests over the network so that all switches in the virtual switch participate in routing data in the network in response to receiving the request; and instruct by the master switch the appropriate switch within the virtual switch to respond to the request.

17. A computer program product stored in a non-transitory tangible computer usable storage medium having computer usable program code embodied therein for using a virtual switch in a network, the computer program product comprising:

- computer usable program code configured to read network configuration data to determine whether a switch is part of the virtual switch in response to the switch connecting to the network;
- computer usable program code configured to send a priority number for the switch to other switches in the virtual switch connected to the network in response to determining that the switch is part of the virtual switch;
- computer usable program code configured to receive priority numbers from the other switches in the virtual switch;
- computer usable program code configured to determine whether the switch has a highest priority number;
- computer usable program code configured to select the switch to be a master switch for the virtual switch in response to determining that the switch does have the highest priority number;
- computer usable program code configured to send domain identification data for the virtual switch to the other switches in the virtual switch, wherein the master switch and the other switches in the virtual switch respond to a plurality of requests over the network as one domain identified by the domain identification data for the virtual switch;
- computer usable program code configured to determine by the master switch an appropriate switch within the virtual switch to respond to a request within the plurality of requests over the network so that all switches in the virtual switch participate in routing data in the network in response to receiving the request; and
- computer usable program code configured to instruct by the master switch the appropriate switch within the virtual switch to respond to the request.

18. The computer program product of claim 17, further comprising:

- computer usable program code configured to become a backup switch for the virtual switch in response to determining that the switch does not have the highest priority number; and
- computer usable program code configured to receive the domain identification data for the virtual switch from the master switch.

19. The computer program product of claim 17, further comprising:

- computer usable program code configured to perform normal initialization in response to determining that the switch is not part of the virtual switch.

20. The computer program product of claim 17, further comprising:

- computer usable program code configured to determine whether the switch receiving a request within the plurality of requests over the network is the master switch in response to receiving the request; and
- computer usable program code configured to forward the request to the master switch in response to determining that the switch receiving the request is not the master switch.

* * * * *